April 16, 1957  J. GUILLERD ET AL  2,789,090
WATER CLARIFYING DEVICES
Filed April 20, 1954  2 Sheets-Sheet 2

United States Patent Office 2,789,090
Patented Apr. 16, 1957

2,789,090

WATER CLARIFYING DEVICES

Jean Guillerd and Jean Goutte, Paris, France, assignors to Compagnie des Eaux et de l'Ozone, Paris, France, a corporation of France Application April 20, 1954, Serial No. 424,448

Claims priority, application France April 24, 1953

3 Claims. (Cl. 210—207)

This invention relates to water treating devices and more particularly to an improved apparatus for softening, clarifying and purifying water. Various types of devices for clarifying water by flocculation of their colloidal substances and decantation of the precipitates obtained and filtration of the water through previous precipitates or a slurry blanket are known.

Most of these devices have a drawback in that they require mechanical members for ensuring either a close contact of the water with the flocculating reagents, or impeller structures for agitation necessary to accelerate the flocculation, or both of these operations. Finally, the shape or the nature of these devices require certain members to be of a special metal that will not be attacked by the chemical reactors used.

This invention has for its object a device which obviates these drawbacks.

It comprises an apparatus for ensuring the flocculation and decantation simultaneously with filtration through a screen of muds or slurry blanket without necessitating any rotary mechanical member or the like for ensuring agitation or pumps for transfer of treated water.

The apparatus is formed of two coaxial cylinders, the inner one of which includes a plurality of partitions in which the flocculation takes place and the outer one constituting a zone wherein the slurry suspended at a given level forms a screen or blanket which ensures the filtration of the clarified water under treatment before draining off of the water through a channel provided on the periphery of the apparatus.

Considering first the flocculation, it is known that to be satisfactory, it requires a perfect distribution of the reagents in the water, followed by proper agitation which allows the collecting of the colloids under the form of voluminous particles (flocculi) capable of precipitating quickly. It is obvious that the agitation must be slow enough in order to avoid breaking the flocculi that are being formed.

According to the invention, agitation can be obtained by introducing the water to be treated, to which appropriate reagents have been added, into a series of compartments which communicate with one another through orifices provided at their upper part and the diameters of which increase in such a way that the passage of the water from one compartment to another one takes place with a whirling action decreasing at the last partition so that the agitation is sufficiently decreased to avoid breaking of the precipitates that have been formed. The sizes of the partitions and the communication orifices are such that the total passage time, the time during which the water stays in the device is the optimum time required for the formation and build up of the flocculus mass.

According to a characteristic feature of the invention, orifices that ensure the communication of the one compartment with another are provided with bent sleeves or pipes extending downwardly and opening at half the depth of the compartments which force the water down to the bottom before flowing up in revolutions to the communication orifices.

The water from the last compartment is then brought through a wide port into a central chamber from which it is introduced through radial channels into the second part of the apparatus which constitutes the filtering and decanting device.

This second part is formed by an annular enclosure with conical walls, a frusto-conical skirt or baffle inclined so as to direct the water from the central chamber towards the bottom of the apparatus being of such a size that the precipitate cannot deposit on the bottom during the operation of the apparatus and as it rises it feeds the mud screen to an appropriate level, namely a level lower than the level of discharge of the clarified water. The screen of mud forms in this way a filtering mass clearly defined. The filtering and decanting device is completed at the bottom with a device collecting the muds or sludge which permits, by acting on the mass, for the control of the working of the various operations relating to the working, the stopping and the starting of the apparatus.

The invention will be better understood from the ensuing description with reference to the attached drawings.

Figure 1:
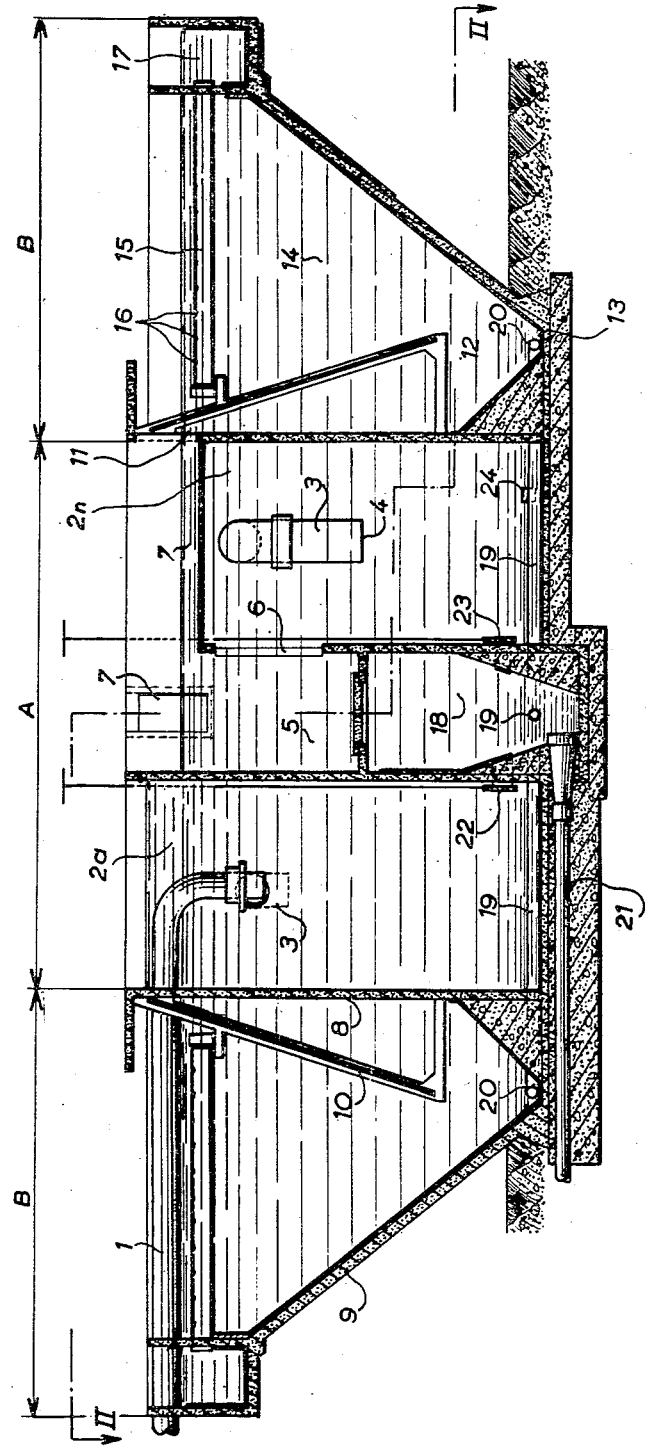
Fig. 1 is a vertical cross-section of an embodiment of an apparatus in accordance with the invention.
Figure 2:
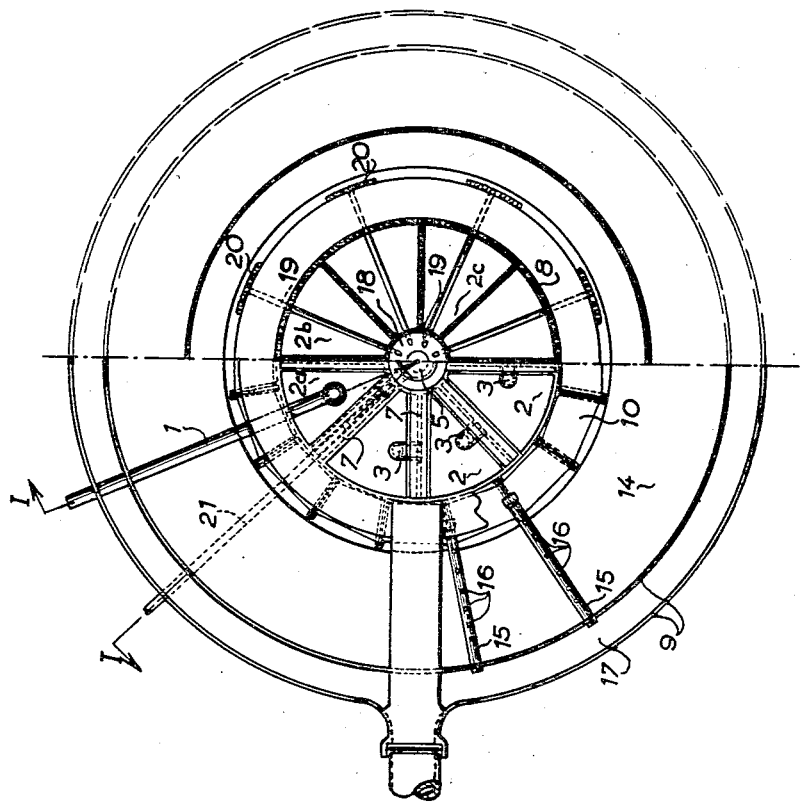
Fig. 2 is a horizontal cross-sectional view taken along II—II of Fig. 1, that is to say, as regards the left half, a top view and as regards the right half, a cross-section along two different planes of the flocculation section, then of the decantation section.

In the drawings, A is the central portion or flocculation zone of the apparatus and which is circular and B is the annular decantation zone. The water to be treated is admitted through a pipe 1 and is drawn by a system of pumps from a river, for instance, and discharged into a series of radial compartments 2. These compartments communicate with each other through apertures provided at their upper part and extend into downwardly bent sleeves or pipes 3.

Chemical reagents are added to the raw water while in the pipe 1 so that the initial mixture and reaction is insured by the pipe supplying the untreated water.

The water containing the reagents comes into the compartments 2a and effects therein, from the bottom to the top, a number of revolutions and is discharged through the pipe 3 into the second compartment 2b where it is again submitted to an upward whirling motion. Then it is discharged in a similar manner from compartment 2b to compartment 2c, the size of the communication orifices increasing so that the agitation is less and less violent from one compartment to the next. In the last compartment 2n the agitation has been so reduced as to provide the optimum flocculation condition.

It is to be noted that the water is discharged from the pipes 3 open at a point 4 which is about at half the depth of each compartment. This arrangement is intended to force the water to go to the bottom of the compartments, to permit, on the one hand, a stirring action or agitation in upward whirling motions and, on the other hand, to avoid any possibility of premature precipitation of the flocculus mass during the working of the apparatus.

In a preferred embodiment of the invention, the time during which the water stays in the section A of the apparatus is about 30 minutes. Of course, the sizes of the various parts of the apparatus may be modified according to the nature of the water and the reagents used.

From the last compartment 2n, the water goes to a central chamber 5 through a port 6 and then through radial pipes 7 provided above the level of the compartments 2 into the section B, namely into the decanting or precipitation and filtering device.

This zone is defined by the vertical cylindrical wall 8 of the compartments 2 and by an outer downwardly inclined frusto-conical wall 9.

About the vertical wall 8 is provided a skirt or baffle 10, the shape, size and arrangement of which, combined with that of the wall 9, meets two requirements:

1. The water entering section B at 11 is discharged along the path 12 at a speed and in the proximity of the floor or bottom 13 sufficiently to insure that the precipitate may not settle and be forced to feed and maintain the precipitate screen 14.

2. The vertical speed of the upward flow eventually decreases to a value which no longer allows the precipitate to be driven upwardly thus the upper level of the filtering mass is clearly defined.

When the apparatus operates, namely, when the filtering mass or slurry has been formed, the water flows through the latter and is collected at the upper part through a plurality of radial pipes 15 provided with holes 16 along their upper surface so as to feed a channel 17. These orifices 16 are spaced at decreasing intervals from the center to the periphery so that the speed of flow of the liquid entering the pipe 15 may be the same at all points on the pipe 15.

An apparatus according to the invention comprises, in addition, various arrangements which allow it to perform the various operations indispensable for its control and which essentially concern the regulation of the filtering mass, namely:

Draining to the sewer preventing swelling of the mass, ensuring at the same time discharge of the impurities retained;

Eventual complete draining off;

Recirculation of partially treated water, chemicals, and precipitated particles as required to seed too thin an initial flocculation.

Accordingly, there is provided, under the central chamber 5 in which the flocculated water is collected, a second central chamber 18, the lower part of which is conical thus concentrating the flocculation. The lower portion of chamber 18 communicates with the bottom 13 of the decanting device through a plurality of radial pipes 19 ending in T-shaped members resting on the bottom 13.

The lower part of chamber 18 is moreover connected on the one hand to the drain and, on the other hand, to the suction side of the untreated water pump so as to permit recirculation through a pipe 21 divided into two pipes each controlled by a valve. These valves are normally closed.

The periodical drainings (as well as the complete draining) are therefore controlled by the mere difference of hydrostatic pressures by opening the valve of the pipe 21 leading to the sewer.

As for the recirculation of the slurry, it is enough to open slightly the valve of the pipe 21 leading to the untreated water pump. The slurry entering through the suction of said pipe at a desired rate, is mixed with and discharged with the untreated water to the head of the flocculator.

Finally the collecting system described permits and ensures proper and immediate starting of the apparatus after stoppage by providing means of seeding raw water when first starting up.

When the apparatus has been stopped, if special care is not taken, the precipitation of the mass will produce a deposit on the floor, which will solidify and adhere thereto. Upon restarting only a very small portion of it would again go into suspension as the agitation would be too weak to achieve this result. This would result in a more or less important absence of filtration until a new sufficient mass or slurry blanket has been formed again. Another consequence would be a gradual accumulation of the slurry which would be more and more difficult to drain off and would entail serious difficulties in the operation.

All these drawbacks may be obviated by collecting at a high rate all the slurry and conveying it to the flocculating device on stopping of the apparatus while the particles which form the slurry are still in suspension. The circuit used in collecting the slurry is the same as the one used for the partial recirculation of the slurry, the valve of the pipe 21 leading to the untreated water pump being wide open and the suction of untreated water being stopped, by means of a retaining clapper, self-operating by pressure differential or by a valve. A few minutes are sufficient to distribute the mass or slurry in the various compartments at the head of the flocculator.

On re-starting, the sludge is easily detached by the agitated flow of the water that takes place in that part of the apparatus.

Once the slurry particles are in a perfectly homogeneous suspension and they have been "reactivated" by contact with the new flocculi carried by the fresh water, they take their own place in the decanting device and gradually reconstitute the slurry blanket or filtering mass in the regular manner and without any disturbing whirl or rising flow. During this time, the decanting device discharges the water that has decanted during the stopping, that is to say a satisfactorily soft water.

In this way, re-starting is effected immediately and under the best conditions as regards quality of the softened and clarified water.

The following details will complete the description of the apparatus:

The chamber 18 communicates with two diametrically opposite compartments of the flocculator, through two pipes controlled respectively by the valves 22 and 23 (normally closed);

Each of the radial partitions of the flocculating device, except the one that separates the last compartment from the first one, has at its bottom a small orifice 24.

The purpose of these arrangements is to permit:

1. Simultaneous filling of the various compartments of the flocculating and decanting device by opening of the said valves.

Thus, the walls of the flocculator work under equal pressures on either side, accordingly the structure may, therefore, be reduced in weight and thickness and simplified.

2. Isolation or non-isolation—at will—of the flocculator for the drainage of the decanting device.

The valves 22 and 23 being normally closed, the flocculator will be isolated when the decanting device is being drained off. The latter operation may thus be effected alone, while keeping, for instance, the mass which has been previously conveyed into the flocculator intact as heretofore stated. Opening of the valves, on the contrary, completely drains the apparatus.

Some advantages of this apparatus over those based on similar principles and now in use have been recited in the specification; other advantages are readily observed. They are as follows: absence of any special mechanical member whether rotating or otherwise, for ensuring the various functions such as flocculation, recirculation or re-use of the flocculus mass, placing of the mass or precise control of the slurry blanket without special devices or means.

The advantage of the absence of such means is obvious. As such members are generally complicated, necessarily made of a metal resistant to water and the chemical reagents, and require a motor and a discharge control device, the assembly is expensive and since it operates continually is subject to mechanical wear.

Full latitude is permitted to determine the ratios of the sizes to adopt; the apparatus may be more or less high according to the requirements of the situation;

The arrangement of the means, according to the invention, permits a construction entirely of concrete and fibro-cement, which is strong and resistant to corrosion and chemical attack;

Conditioning of the flocculus mass formed in a part specially intended for this purpose; the flocculator being of a new type of an utmost efficiency (maximum reduction of the "short-circuits," decreasing speeds, etc.) and The possibility of recirculating the flocculus mass as a flocculation adjuvant, in a variable amount and adjustable at will.

Of course, there is the opposite possibility of preserving the nascent flocculus mass during all the conditioning or treatment period from contact with the preformed mass when the latter is prejudicial, due to the nature of certain waters.

The mud mass may vary by considerable amounts, without the filtration being practically altered. This results in a large adaptability of the drainage controls and system which no longer need to be automatically controlled, since draining is not frequent. Most often, a single change of slurry per day will be sufficient.

Considering these properties, it can readily be seen that no apparatus now available has all of them.

Finally, the arrangements concerning stopping and effectual immediate re-starting, should be mentioned.

It may be seen that none of the apparatus presently in use, falling within either or the other of the following categories, from this point of view, offer the two-fold advantage of immediate re-starting yielding clarified and softened water of excellent quality:

1. Accordingly the known devices have: starting effected simultaneously with the suspension of the deposits of the decanting device, the immediate result of which is immediate formation of whirls and disturbing upflows until the mass is in its balance position entailing an absence of filtration during that displacement. In short, immediate starting, but poor quality of the effluent water during a period of time which may be considered as long; or 2. Placing of the slurry blanket by internal cycling re-circulation, for instance, before the actual starting, which ensures satisfactory results from the point of view of quality, but requires a preliminary step which is more or less long, according to the possible rate at which the cycling may be effected.

While a preferred embodiment of the invention has been illustrated and described, it will be understood that the invention is in no way limited to this embodiment and that many changes may be made within the spirit and scope of the invention as defined by the following claims.

What we claim is:

1. A cylindrical flocculating device consisting of a plurality of radial prismatic compartments successively communicating with each other, except the first and the last one, through downwardly bent pipes of increasing diameters, imparting a hydraulic motion to the water to be treated, a cylindrical chamber in the center of said cylinder collecting the flocculated water from the last compartment of the flocculator.

2. A flocculating device according to claim 1, around which there is disposed an annular decanting device consisting of a frusto-conical skirt fixed to the flocculator itself, and of an outer wall having a frusto-conical surface, the latter being inverted relatively to that of the skirt, the flocculated water being ducted from the central cylindrical chamber of the flocculator to the periphery of the top of the skirt through radial channels, the water decanted and filtered through a screen of muds being taken off at the upper part of the annular decanting device through a series of perforated radial tubes fixed on the one hand to the top of the skirt and on the other hand to the periphery of the wall of the decanting device and terminating in a main annular collector disposed around the decanting device.

3. A combination flocculating-decanting device according to claim 1, comprising moreover a system for draining off the muds which involves below the central chamber of the flocculator a second chamber communicating with the circular floor of the decanting device through perforated T-shaped tubes permitting of draining the muds up to said second chamber wherefrom they can further be discharged.

References Cited in the file of this patent
UNITED STATES PATENTS

| | | |
|---|---|---|
| 871,226 | Jones | Nov. 19, 1907 |
| 2,108,021 | Russell | Feb. 8, 1938 |
| 2,127,314 | Spaulding | Aug. 16, 1938 |
| 2,128,569 | Velz | Aug. 30, 1938 |
| 2,464,617 | Sebald | Mar. 15, 1949 |
| 2,573,941 | Walker et al. | Nov. 6, 1951 |
| 2,635,758 | Walker | Apr. 21, 1953 |